J. H. BAIR.
ROTARY INTERNAL COMBUSTION ENGINE.
APPLICATION FILED JAN. 18, 1919.
1,377,383. Patented May 10, 1921.
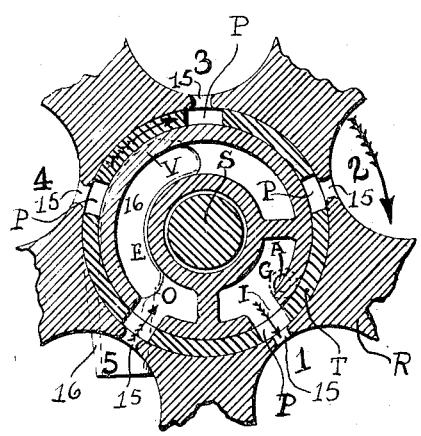
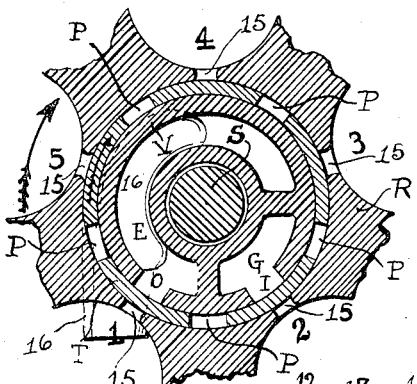
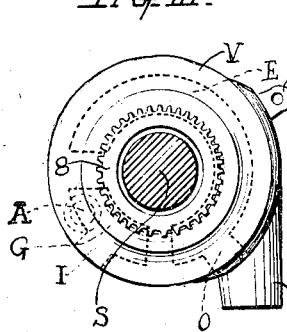
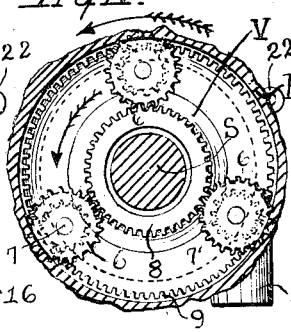
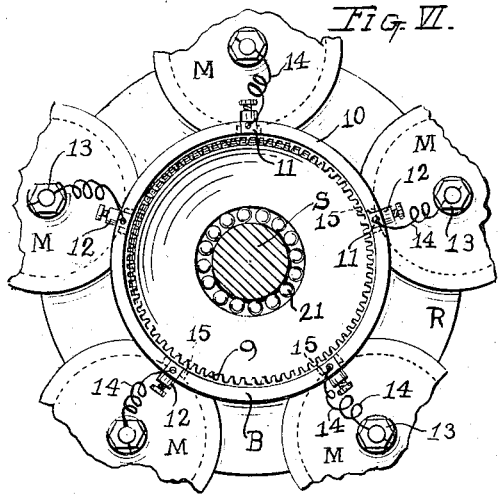
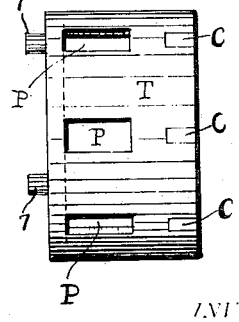
INVENTOR.
JOSEPH H. BAIR
BY
Augustus B. Stoughton
ATTORNEY

UNITED STATES PATENT OFFICE.

JOSEPH H. BAIR, OF HADDONFIELD, NEW JERSEY.

ROTARY INTERNAL-COMBUSTION ENGINE.

1,377,383.  Specification of Letters Patent.  Patented May 10, 1921.

Application filed January 18, 1919. Serial No. 271,777.

*To all whom it may concern:*

Be it known that I, JOSEPH H. BAIR, a citizen of the United States, and residing in Haddonfield, in the county of Camden and State of New Jersey, have invented certain new and useful Improvements in Rotary Internal-Combustion Engines, of which the following is a specification.

My invention relates to a rotary timing device for rotary internal combustion engines and the primary object is to provide a single mechanism which controls both the intake and exhaust impulses and also the ignition of the spark plugs.

To this end I provide a recess, in the hub of the rotor carrying the cylinders, into which extend ports, one from each such cylinder and equally spaced in the face of the recess. In the depth of the recess is an internal gear concentric with the shaft of rotation, and with the recess and fast on the rotor. Into the recess is pushed a ported tight fitting cylinder with paired intermediate gears on studs on the end flange thereof to mesh on the periphery with the internal gear and on the shaft of rotation with a pinion. This pinion is fixed on the end of the intake exhaust part which slips tight into the timing cylinder just described. The gears are in line and arranged as shown in the drawings. The fixed gear forms a track upon which intermediate gears run driven by the internal gear on the rotor as a propeller.

The device is adapted to control, and be the timing mechanism for, the intake-exhaust, and ignition, of a four cycle rotary internal combustion engine and its chief merit is its simplicity of construction and operation. Other advantages are positiveness, compactness, cheapness, accessibility and its features are more readily comprehended in reference to the drawings.

Figure I, is a cross section through the timing valve, in operative position in the rotor, with the outside of the cylinders broken away. It shows the ports of the rotor, connecting with the cylinders, superposing those of the timing cylinder and two thereof superposing respectively those of the intake I, and outlet o, of the inner chambered sleeve.

Fig. II is the same as I, except that the rotor has advanced one step in the direction indicated by the arrow and the timing ring only half a step. No ports are in register with each other.

Fig. III, is the inner end view of the chambered ported sleeve, showing the end pinion and in dotted lines the position transversely of the chambers and the ports therein.

Fig. IV, shows a section on the line IV—IV of Fig. V. It shows the timing gear arrangement by means of which the ported cylinder, upon which the bearing studs for the paired intermediate gears are mounted, is revolved with the rotor at half its speed.

Fig. V, shows the timing mechanism with its gear arrangement placed in the recess of the rotor. The rotor is broken and cut away (in section) except the timing collar in front. The figure also illustrates the bearing for the rotor on the shaft and the ignition timing and spark advance arrangement.

Fig. VI, is a front view of the rotor (with parts of the cylinders cut away). The timing recess with the internal gear in the depth and the bearing still farther in are shown. Around the outer edge of the recess flange B, are contact points, binding posts and connecting wire one for the spark plug of each cylinder. A port, one for each cylinder, connects it with the recess.

Fig. VII, is a detail of the timing cylinder showing the contact points and the ports.

S, is the fixed shaft of rotation, R, the rotor with M the cylinders thereon. These cylinders and their ports 15, are numbered 1, 2, 3, 4 and 5. Into a circular recess with which these ports connect is pushed a timing cylinder T, having ports P therein, to register with the cylinder ports 15, and contact plates C, to register with the contact points 11, on the flange B, of the recess and to thereby connect one thereof with the current from the source of ignition by means of wire F, and contact plate 19, which is on an L arm 18, and shiftable thereby and rod 17, connected with the spark advance lever (not shown) to determine within certain limits the position of that cross connection. The contact point 11, is connected with the spark plug 13, in the cylinder M, by means of binding post 12, and conductor wire 14. The engine by means of the spark plug forms a grounding.

Inside the cylinder T, and loosely surrounding the shaft S, is the fixed two chambered sleeve V. These chambers are G, for the gas with its cylinder intake port I, and E, for the smoke with its exhaust port o, to receive the smoke from the cylinders M, and to exhaust it at the terminating spout 16, of the exhaust chamber and which connects by a pipe with the muffler (not shown). The intake chamber G, receives its supply of gas from the carbureter (not shown) by means of the canal A (Figs. III and V).

The valve ignition timing gears are pinion 8, fast on valve v, intermediate gears 6, pinioned on studs 7, on the timing cylinder T, and internal gear 9, fast on the rotor. These gears are intermeshed and in line as shown in Figs. IV and V. The gear 8, and the ported part V, with which it is fixed are kept from turning by means of a stay rod (not shown) hooking (like arm 17) into the eyelet on arm 22, of the part V. This stay rod is at right angles to the arm 22, and allows the part V, to accommodate itself without binding (or forming a bearing for the rotor R) on the revolving cylinder T, in the valve recess, due to any vibration of the rotor R, or wear in the bearing 21.

The timing result is as follows: The ports 15, of the cylinders M, fast on the rotor revolve with it. So likewise do the contact points 11, one for each cylinder M, revolve with the rotor. The ports P, and also the contact plates C, on intermediate cylinder T, one of each for each of the respective ports 15, and contact points 11, on the rotor R, and adapted periodically to register therewith and superpose them, travel half as fast (as those on the rotor) by means of the timing gears already described. The inner member V, has only two ports. The one I, connecting with the gas chamber G, and the other o, connecting with the smoke chamber E. These ports are arranged in the line of travel of the ports P and 15, and alternately register with them. These ports are separated one step of rotation apart and equally distant from the out position of the piston. (The pistons and piston control mechanism of the engine is not shown but pertains to the engine organization embodied in application filed December 27th, 1918, being Serial No. 268,507, and is one of the sub-divisions called for.) When a cylinder is vertically above the shaft of rotation its piston is in and when vertically below it out. In the position shown in Fig. I, the ports 15 and P, superpose and the ports of cylinders 1 and 5, are in register respectively with the intake I, of the gas chamber G, and outlet o, of the smoke chamber E. This takes place when the piston of cylinder 1, has partly completed its intake stroke and the ports will remain open until the intake stroke is completed. As soon as the compression stroke takes place port 15,
in cylinder 1, is closed. It remains closed until is passes the exhaust port o, to the end of compression stroke when ignition takes place and the piston of cylinder 1, is driven out to the end of the stroke and the port 15, of cylinder 1, remains closed as it passes the position of intake port I, and until it has passed the center when it begins to register with the exhaust o, of the smoke chamber E. It will be seen by following the rotation that a cylinder registering with port I, remains closed until it passes port o, and again port I, and then opens into o. Likewise contact point 19, in register with a contact point 12, by means of an intermediate plate C, on the timing cylinder T, does not register again with it until the rotor R, has made two revolutions. Alternate cylinders are ignited, and also their ports intake and exhaust alternately as will be shown in the following table:

| No. of cylinder. | Intake. | No. of cylinder. | Exhaust. | Ignition. |
|---|---|---|---|---|
| 1 | Open | 5 | Open | |
| 2 | Closed | 1 | Closed | Fire. |
| 3 | Open | 2 | Open | |
| 4 | Closed | 3 | Closed | Fire. |
| 5 | Open | 4 | Open | |
| 1 | Closed | 5 | Closed | Fire. |
| 2 | Open | 1 | Open | |
| 3 | Closed | 2 | Closed | Fire. |
| 4 | Open | 3 | Open | |
| 5 | Closed | 4 | Closed | Fire. |
| 1 | Open | 5 | Open | |

As has been shown and is illustrated in the drawings the spark can be advanced and retarded to meet all the requirements.

Various details of construction and arrangement can be resorted to without departing from the spirit of the invention.

I claim:

1. In a rotary internal combustion engine in combination a solid shaft, a cylinder bearing rotor revoluble on the shaft, a recess in the rotor concentric with said shaft, ports common to the recess and cylinders of the rotor, a stationary cylinder encircling and spaced from the shaft and bearing intake and exhaust chambers and having ports connected therewith, and a timed sleeve intermediate the recess walls and the chambered cylinder, ports therein one for each cylinder of the rotor and common to those of the recess and of the chambered cylinder.

2. In a rotary internal combustion engine in combination a cylinder bearing rotor, a recess in the rotor concentric with the axis of rotation, ports common to the recess and cylinders of the rotor, a cylinder bearing intake and exhaust chambers and having ports connected therewith, a timed sleeve intermediate the recess walls and the chambered cylinder, ports therein common to those of the recess and of the chambered cylinder, and means for rotating the intermediate sleeve at half the speed of the rotor.

3. In a rotary internal combustion engine and in combination three nested valved elements of which the outer two are rotatable in respect to each other and to the inner one which is provided with intake and exhaust passages and of which the outer one is provided with cylinder ports and the intermediate one with ports equal in number to the cylinder ports and coöperating with both the passages and cylinder ports.

4. In a rotary internal combustion engine the combination of a rotor provided with admission and exhaust cylinder ports, a second relatively fixed valve element provided with both inlet and exhaust passages, and a third rotary valve element provided with ports equal in number to the cylinder ports and coöperating with both the cylinder ports and the passages, substantially as described.

5. In a rotary internal combustion engine a rotor carrying cylinder, a rotary sleeve valve ported for controlling admission and exhaust, two sets of electric contacts, whereof one is carried by the sleeve and the other by the rotor and connected to the spark plugs of the cylinders, and a third relatively fixed current carrying contact which coöperates with the contacts of one set and through them with the contacts of the other set.

JOSEPH H. BAIR.